UNITED STATES PATENT OFFICE.

EDWARD C. BRICE, OF WASHINGTON, DISTRICT OF COLUMBIA.

ARTIFICIAL STONE.

SPECIFICATION forming part of Letters Patent No. 555,207, dated February 25, 1896.

Application filed October 24, 1895. Serial No. 566,777. (No specimens.)

*To all whom it may concern:*

Be it known that I, EDWARD C. BRICE, a citizen of the United States, residing at Washington, in the District of Columbia, have invented certain new and useful Improvements in Artificial Stone; and I do hereby declare the following to be a full, clear, and exact description of the invention, such as will enable others skilled in the art to which it appertains to make and use the same.

My invention is an improvement in the manufacture of artificial stone for building and for other purposes, as those in which natural stone or burned brick are used.

My invention consists in a new composition of matter.

The invention also consists in the process by which this composition is made.

In carrying out my invention I take one (1) part of sand and one (1) part of clay. These substances are thoroughly mixed together in a suitable vessel where water is added in sufficient quantity to make the mixed material wet enough to roll into balls. These balls or lumps are then placed in a cupola or blast furnace in the following manner:

First. The fuel is laid on the bottom of the furnace, next a layer of the mixed sand and clay. The fuel is ignited and the heat raised by turning on the blast. The furnace is then charged alternately with fuel and the mixed sand and clay in about the proportions stated until the furnace is quite full. The operation of charging the furnace is continued as long as desired. The mixed sand and clay, melting, is collected on the hearth of the cupola, where it is drawn off from time to time, cooled, and ground. The above constitutes the first part in the process and consists in the manufacture of a bond to be used in the second part of the process. I prefer to use clay and sand in equal proportions to make this fused bond, but instead of using these two I may use one of them alone, also instead of either of them I may use broken stone or earth of any kind. In fact the important part of this step is in the melting of the material in the furnace, and not the material used.

Second. I take two parts of the above-described material which I call the "bond," and one (1) part of sand and (1) part of clay, earth, or stone, all in a powdered condition, which I call the "filler." These ingredients are thoroughly mixed together in a suitable vessel where water is added in sufficient quantities to make the mixed ingredients moist. This mass is then molded into any desired size, carried into a suitable drying-kiln, and dried. The molded forms are then carried into a suitable furnace, burned to a red heat, and when cool are a finished product, and are ready for use in the construction of buildings, furnaces, and paving streets.

I may vary the proportion of material used as a bond, as well as the ingredients used as a filler. For instance, in the manufacture of fire-brick, where a great degree of hardness is not essential and a great resistance to a high degree of heat is required, I take one part of the bond described and nine parts of fire-clay or analogous material, such as silica, soapstone, &c. These ingredients are compounded, mixed, pressed, and burned in the same manner as for the building or paving stone, but the finished product is of a softer character, which adapts this stone for use in the interior linings of furnaces. The fire-clay or analogous material, such as silica, &c., is an equivalent to the sand and clay used as fillers in the artificial building and paving stone in this process, the difference being that this product when finished is an open, porous mass, which is required in a fire-proof material, while stone for building and paving purposes must be a hard, non-porous, solidified mass.

I may use instead of one (1) part of sand and one (1) part of clay, described as a "filler" in the second step of this process, powdered earth or stone of any kind, these ingredients being equivalent to the sand and clay described as the "filler."

I am aware of the patent to Rust, No. 567, granted August 22, 1872, for "An improved composition especially applicable for use in sanitary, pictorial, decorative, and building purposes." In this patent the bond described is glass mixed with sand. Glass is a variable compound of the silicates of potash and soda, lime, litharge, and other fluxes. These ingredients are not used by me. In the Rust patent the bond always contains, as a part of the composition, potash or soda, while my composition is composed of sand and clay.

The process of Rust is the production of a fused bond in a reverberatory furnace, while I use, always, a cupola or blast furnace. Therefore both the composition and process used by me widely differ from that described in Rust's patent; but I am not aware, prior to this invention, that an article has been produced by melting a substance composed of a mixture of sand and clay or analogous materials, for the purpose of making a bond, by melting the above-described mixture in contact with the burning fuel in a cupola or blast furnace.

Having now described my invention, what I claim is—

1. A new composition of matter consisting of a bond composed of a melted mixture of sand and clay, or analogous substances in about the proportions stated, and a mineral filler, in about the proportions stated, as set forth.

2. The improved process of making artificial stone, &c., which consists, first, in melting a mixture of sand and clay, or analogous substances, in contact with the burning fuel; second, mixing this melted substance with a mineral filler; third, adding water to this mass; fourth, molding the material into shape; fifth, drying, and sixth, burning the same, as set forth.

In testimony whereof I affix my signature in presence of two witnesses.

EDWARD C. BRICE.

Witnesses:
C. S. DRURY,
J. B. NICHOLSON.

It is certified that in Letters Patent No. 555,207, granted February 25, 1896, upon the application of Edward C. Brice, of Washington, District of Columbia, for an improvement in "Artificial Stone," errors appear in the printed specification requiring correction as follows: In lines 18 and 25, page 2, the word "substances" should read *substance;* and that the said Letters Patent should be read with these corrections therein that the same may conform to the record of the case in the Patent Office.

Signed, countersigned, and sealed this 3d day of March, A. D. 1896.

[SEAL.]

JNO. M. REYNOLDS,
*Assistant Secretary of the Interior.*

Countersigned:
JOHN S. SEYMOUR,
*Commissioner of Patents.*